United States Patent [19]

Merhar

[11] Patent Number: 5,447,245
[45] Date of Patent: Sep. 5, 1995

[54] GRADUATED PROPORTIONING AND MIXING CONTAINER

[76] Inventor: Richard D. Merhar, 551 Morewood Pkwy., Rocky River, Ohio 44116

[21] Appl. No.: 94,556

[22] Filed: Jul. 20, 1993

[51] Int. Cl.$^6$ .............................................. B65D 1/04
[52] U.S. Cl. .................................. 215/6; 215/DIG. 8; 222/158; 73/427; 206/221
[58] Field of Search ............... 215/6, 100 R, 341, 343, 215/352, 101; 220/304, 555, 234, 219; 222/158; 73/427; 128/762

[56] References Cited

U.S. PATENT DOCUMENTS

| | | | |
|---|---|---|---|
| D. 236,314 | 8/1975 | Sugai | D7/1 |
| 3,338,452 | 8/1967 | Oakley et al. | 220/23.4 |
| 3,533,526 | 10/1970 | Adell | 215/101 |
| 3,658,204 | 4/1972 | Bottger | 220/23.4 |
| 3,948,105 | 4/1975 | Johnson, Jr. | 73/427 |
| 4,079,629 | 3/1978 | Hope | 73/427 |
| 4,088,250 | 5/1978 | Schaefer | 215/100 R X |
| 4,292,846 | 10/1981 | Barnett | 73/427 |
| 4,298,038 | 11/1981 | Jennings | 222/158 X |
| 4,658,977 | 4/1987 | Crisci | 215/341 X |
| 4,743,236 | 5/1988 | Manschot | 128/762 X |
| 4,817,809 | 4/1989 | Rozmestor | 220/23.4 |
| 4,860,927 | 8/1989 | Grindle | 222/158 |
| 4,877,150 | 10/1989 | Otto et al. | 220/304 |
| 5,105,958 | 4/1992 | Patton | 215/100 R |
| 5,123,460 | 6/1992 | Reed | 222/158 X |

OTHER PUBLICATIONS

Four photographs, designated A, B, C and D, of an automobile windshield wash container, showing an female mounting bracket for mounting the container, and a male mounting member upon which the associated pump is believed to be mounted. (Photocopy included herewith).

Primary Examiner—Allan N. Shoap
Assistant Examiner—Christopher J. McDonald
Attorney, Agent, or Firm—Pearne, Gordon, McCoy & Granger

[57] ABSTRACT

A graduated proportioning and mixing container is disclosed, which includes two liquid-receiving compartments and a mixing compartment. One liquid-receiving compartment is larger than the other, and both are graduated to indicate ratio-designated levels, by which two liquids may be mixed in definite, accurately and precisely determined ratios. The preferred use of the container is for preparation of two-cycle fuel mixes, containing certain various ratios of gasoline to oil. The smaller of the two liquid-receiving compartments is downwardly tapering, with the volume of the downwardly tapering compartment decreasing toward the bottom of the container. The larger compartment has a complimentary shape, so that the container as a whole has a rectilinear shape. The container further includes two openings, one associated with each liquid-receiving compartment, and each opening has a threaded cap. Each opening is adapted to provide a triple seal, in order to avoid leakage of the contents. The container has one handle at its top, and a second handle formed by the lowermost portion of the smaller compartment, the second handle having a finger-receiving area partially defined by a web which both separates and connects the two compartments.

28 Claims, 6 Drawing Sheets

GRADUATED PROPORTIONING AND MIXING CONTAINER

BACKGROUND OF THE INVENTION

Among the large number of multiple compartment containers in the prior art, there appears to be no single container combining certain desired features. A first such feature enables a user to add liquid separately to two separated and isolated liquid-receiving compartments, ascertain by visual inspection the respective levels the proportional volume relationship, very accurately adjust one of the levels to yield a predetermined volume relationship and blend the liquids by tilting the container to move them along a third superposed mixing compartment to produce the desired composite for a specific application. A second container feature includes two handles for carrying or manipulating the container. Another feature is mounting devices with which the container can be mounted on a vehicle or other stable platform. Yet another feature is a second mounting device with which an auxiliary container can be mounted "piggy-back" on the main container, and yet another feature includes triple-sealed outlets.

A container of the general type to which the present invention pertains, but which lacks certain of the features of the present invention, is described in U.S. Pat. No. 3,948,105, the disclosure of which is incorporated herein by reference.

An important use for the proportioning and mixing graduated container herein described is the production of a blend of a two-cycle lubricating oil and gasoline at the proper ratio for burning as a fuel in two-stroke cycle (two-cycle) internal combustion engines. Such engines, because of their relatively greater power output per unit of piston displacement, are widely used for powering racing and other high-performance motorcycles, recreational vehicles such as snowmobiles and jet-skis, hand-held power tools, outboard motor assemblies and similar applications. Various two-cycle engines require different ratios of oil and gasoline, and it is very important that a particular two-cycle engine have exactly the proper ratio in the fuel supplied to it. For a given engine, the combined gasoline and oil blend is known as premix.

Improper fuel-oil mixtures are a principal cause of operating problems with two-cycle engines. If insufficient oil is present in the mixture the moving engine parts will overheat and seize; if excess oil is present, such adverse effects as engine smoking, sparkplug fouling and loss of power quickly result.

It is an object of the present invention to provide a new and improved graduated container for proportioning and mixing various liquids, especially gasoline and two-cycle lubricating oil, wherein the container combines the desirable features set out above.

SUMMARY OF THE INVENTION

The graduated container described herein has two spatially separated and isolated liquid-receiving compartments. These compartments are generally vertically extending and have indicia showing the level of liquid contained in each one. Each such compartment merges with a superjacent horizontally extending mixing compartment, which is preferably generally triangular in section. The top includes a first handle at its apex and a relatively restricted throat portion providing separation between the compartments. The throat provides communication between the compartments when the container is inverted or shaken during mixing of the contents. The shape of the container is suitable for plastic molding; one suitable and preferred material of the many available is high-density polyethylene. The material used is preferably transparent or translucent, to facilitate quick visual determination of the level of the liquid contained therein. The graduated level marks and associated numbered indicia are conveniently molded as embossed characters integrally with the body portion, or may be applied subsequent to molding.

The graduated container has a large main compartment extending downwardly from a first portion of the mixing compartment, and a relatively smaller compartment, extending and tapering downwardly from a second portion of the mixing compartment. The mixing compartment is superposed coextensively over the main and smaller compartments, and provides communication therebetween. The smaller compartment is downwardly tapering, being wedge-shaped, pyramid-shaped or cone-shaped, larger at its upper end than at its lower end and for substantially all of its vertical extent is attached to the larger compartment by means of a web-like connecting portion. The upper portion of both the large and small compartments is connected to the top. The top comprises the first handle and the upper portions of the mixing compartment. Disposed between the upper end of the web-like portion and the lower portion of the first handle is the relatively restricted throat portion. Both the smaller and larger compartments have a "head space" or normally unfilled space above the liquid level merging with each other in the mixing compartment via the relatively restricted throat portion. The combined head space constitutes the mixing compartment.

The smaller compartment is generally downwardly tapering, preferably being wedge-shaped or pyramid-shaped, with the cross-sectional area of the wedge or pyramid decreasing from the top to the bottom of the compartment. The larger compartment has a shape complimentary to that of the smaller compartment, so that the overall shape of the container when viewed from the side is generally rectilinear. The downwardly tapering, such as wedged or pyramidal, shape of the smaller container provides for a greatly increased accuracy of measurement, particularly when measuring only a small volume of oil, or when a premix having a high ratio of gas to oil is required. In prior mixing containers, if only a small volume of premix is to be measured, a small error in measurement of the oil portion of the premix could result in a large error in the ratio of gas to oil in the final premix, with resulting negative consequences to operation of the two-cycle engine. The present invention avoids this problem by providing a greatly increased accuracy of measurement for the oil portion of the premix made with the container of the invention. The wedge-shaped compartment makes it much easier and more accurate to measure small volumes. Due to the wedge or triangular shape, at the small end of the wedge a small change in volume makes a relatively large change in the height of the liquid column in the compartment than with the prior art container. Small adjustments in oil volume are thereby facilitated, resulting in a significant increase in accuracy and precision in the finally obtained ratio of gas to oil.

Another important aspect of the invention is that the top of the container preferably has two sealable or closable openings, with the first handle disposed therebetween. The first opening functions as a filling point for the first liquid, usually gasoline, to be placed in the larger compartment since it is disposed directly above the larger compartment, and is located so that premix liquid may be conveniently poured out of the container after mixing. The second opening is located so that a second liquid may be conveniently poured exclusively into the smaller compartment with virtually no chance that it will inadvertently enter the large compartment. It is very important to avoid allowing the second liquid, usually oil, to reach the large compartment during the measuring process, since the ratio between the first and second liquids would be not only erroneous, but difficult to correct or compensate for by adjusting the volumes of the component liquids. This avoidance is further assisted in the invention by the placement and configuration of the throat in the mixing compartment, which is well removed from the second opening, both vertically and horizontally. In the prior art, such as U.S. Pat. No. 3,948,105, separation of the compartments for this purpose was achieved by an unwieldy and large horizontal separation of the compartments. In other prior art, the openings were above the throat, so that liquid was easily misdirected into an unintended compartment.

This disposition of the openings assures that during addition of the liquids to the graduated container, the liquids are not mixed until the desired volume relationships therebetween are controllably established.

A further aspect of the present invention is that the bottom end of the downwardly tapering, preferably wedge-shaped smaller compartment is sufficiently separated from the larger container by the web-like portion to provide a convenient second handle in the preferred embodiment. The web-like portion connecting the two compartments allows the second handle to be useful for lifting the lower end of the container when mixing together or pouring out the contents of the container.

A further aspect of the invention is that the container displays a vertical column of a number of graduated marks indicating liquid level and associated quantity-indicating indicia which extend upward from the bottom along one or more vertical surfaces of the large compartment. On one or more sides of the smaller compartment is an array of similar and corresponding vertical columns of graduation marks, each extending upward from the bottom of the small compartment, on vertical surfaces thereof. The graduations on the smaller compartment correspond one for one numerically to those on the large compartment, with the corresponding volumes in each compartment related according to the ratio for that column of the array. The number of columns in the array is determined by the number of ratios needed for various uses of the premix, one such column for each ratio.

In another aspect of the invention, rather than an array of discrete vertical columns, each designated by a particular, individual ratio of volumes in the large and small compartments, the volume for any chosen ratio may be determined by reference to a chart. The chart is preferably embossed on a side of the smaller compartment, and indicates directly the level to which the second compartment need be filled to attain the selected volume and ratio of the first liquid in the first compartment to the second liquid in the second compartment. The preferred chart allows the user to select any ratio in a wide range, such as from 10:1 to 100:1, rather than limiting the user to a particular, pre-selected set of ratios.

Following addition of the proportionate measurement of the two liquids into their respective compartments, a sealable closure is placed over each of the openings to the compartments, and the graduated container inverted and tilted back and forth to thoroughly mix the contained liquids. Having two handles on the container allows the user to easily lift and invert the container, and the sealing devices on the openings prevent any leakage during the mixing process. The mixture is then a properly adjusted oil-gasoline blend for use in the operation of a two-cycle engine, known as the premix fuel or, simply, premix.

DESCRIPTION OF THE PREFERRED EMBODIMENT

Figure 4:
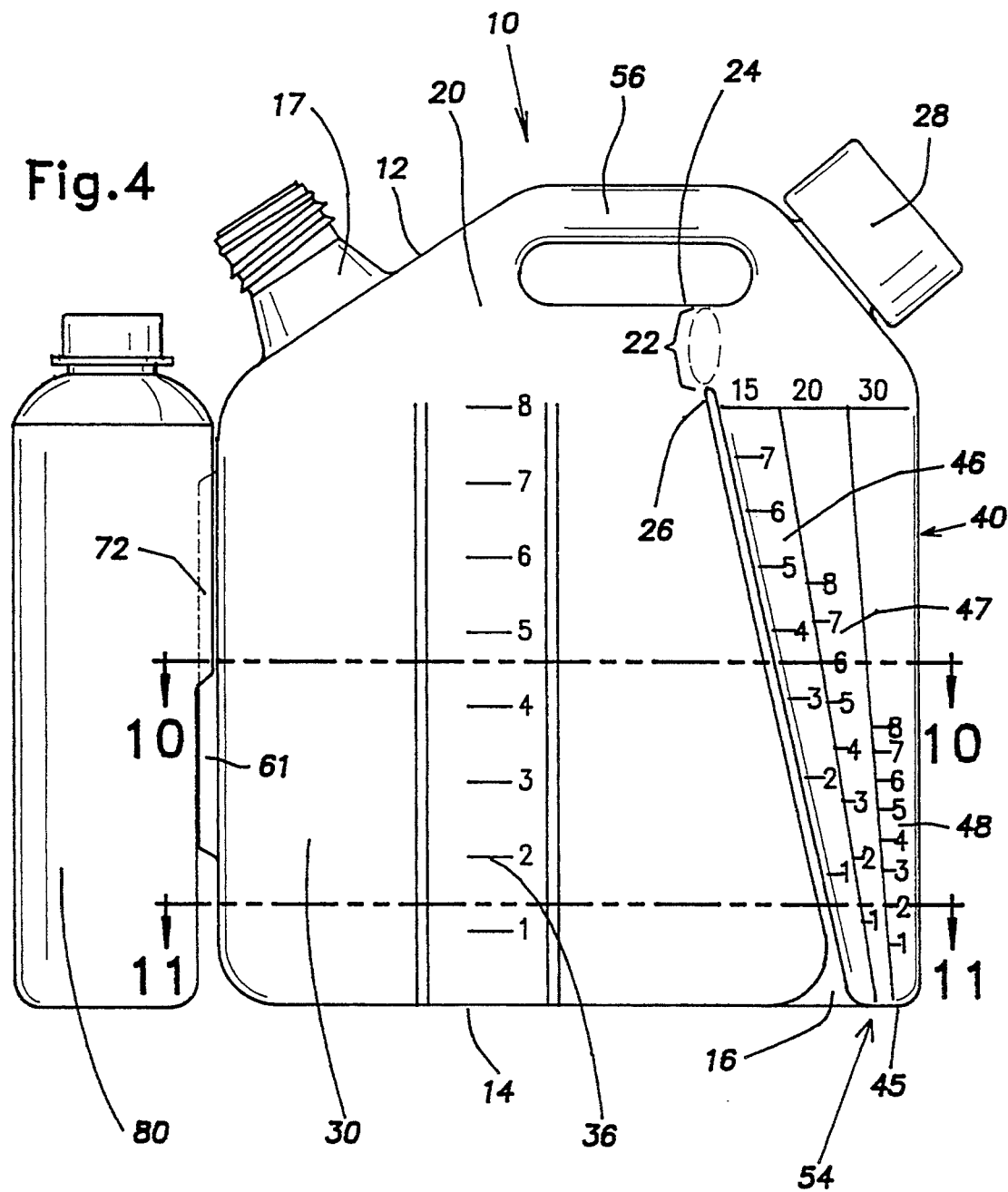
FIG. 4 is a side elevational view of the container with the auxiliary container mounted in accordance with the invention.
Figure 5:
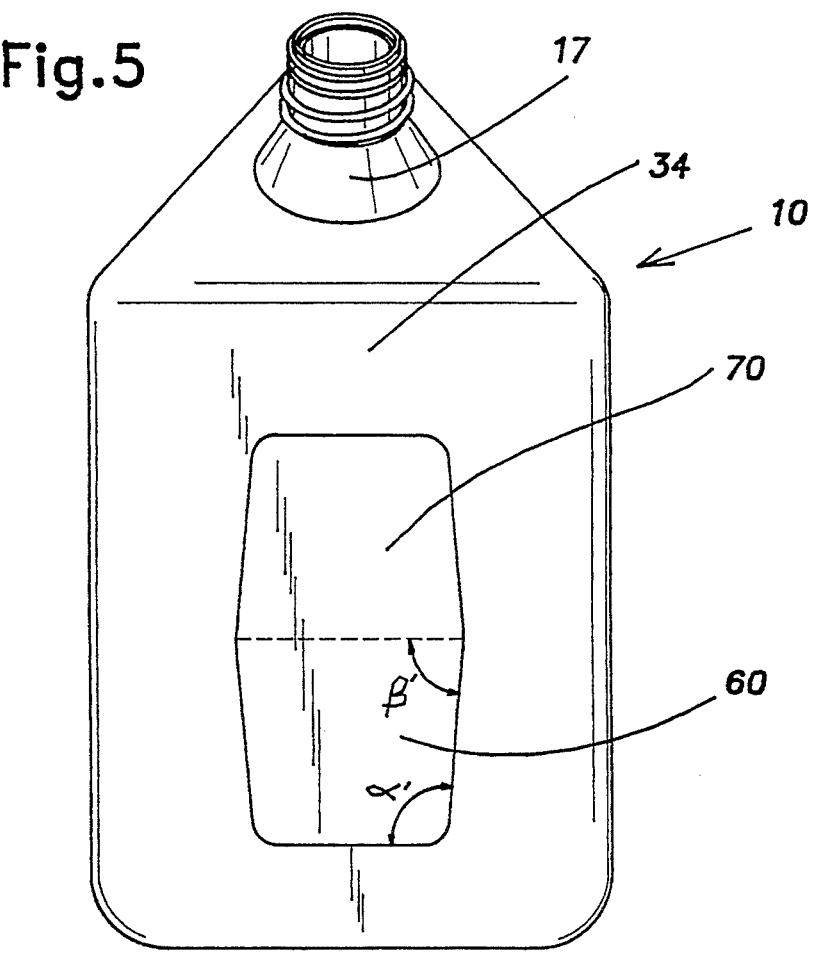
FIG. 5 is a front elevational view of the container in accordance with the invention.

As illustrated at FIGS. 4 and 5, the graduated container 10 of the present invention is an elongate container of generally rectangular shape. The container of the present invention is preferably made by conventional blow molding techniques. As shown in FIG. 4, the container 10 includes a first or main liquid-receiving compartment 30 in communication with a second, much smaller liquid-receiving compartment 40 via the superjacent mixing compartment 20, the latter including the restricted coextensive throat portion, indicated generally at 22. A top 12, preferably generally triangular in section, extends longitudinally over all three compartments and functions as the upper bounding surface of the interconnecting horizontally extending mixing compartment 20, partially defining the mixing compartment 20. The top may also be generally curved or flattened, with a handle embedded in the mixing compartment or extending thereabove.

The geometry of the graduated container 10 is such that it assumes a stable upright posture when resting on the generally flat bottom 14 of the main compartment 30. The bottom of the main compartment 30 may constitute the bottom of the entire container 10, or alternatively the lower end 45 of the second compartment may contact the surface underlaying the container 10. The wedge-shaped smaller compartment 40 tapers downward to an end 45 at or slightly above the level of the bottom 14. Thus the bottom of the container is generally flat, providing good stability, but may have indentations such as at slot 16.

Figure 1:
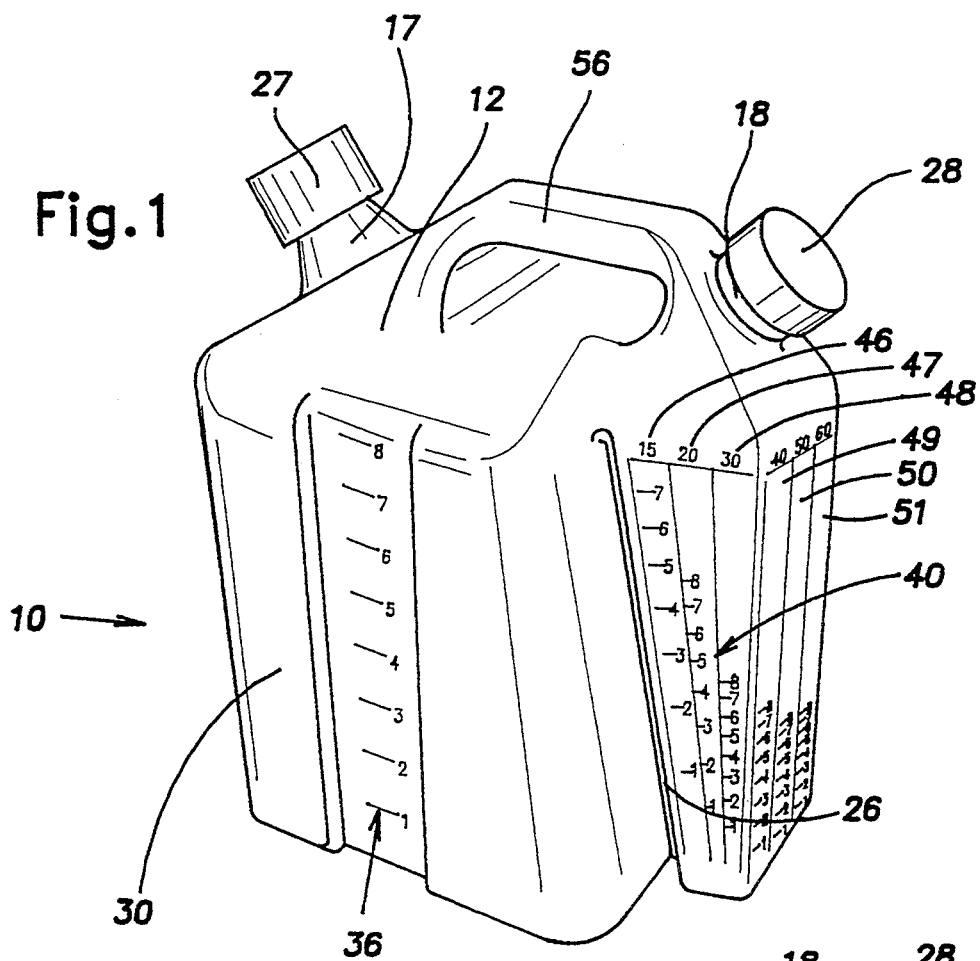
FIG. 1 is a perspective view from above and to the rear of a first embodiment of the container in accordance with the invention.
Figure 3:
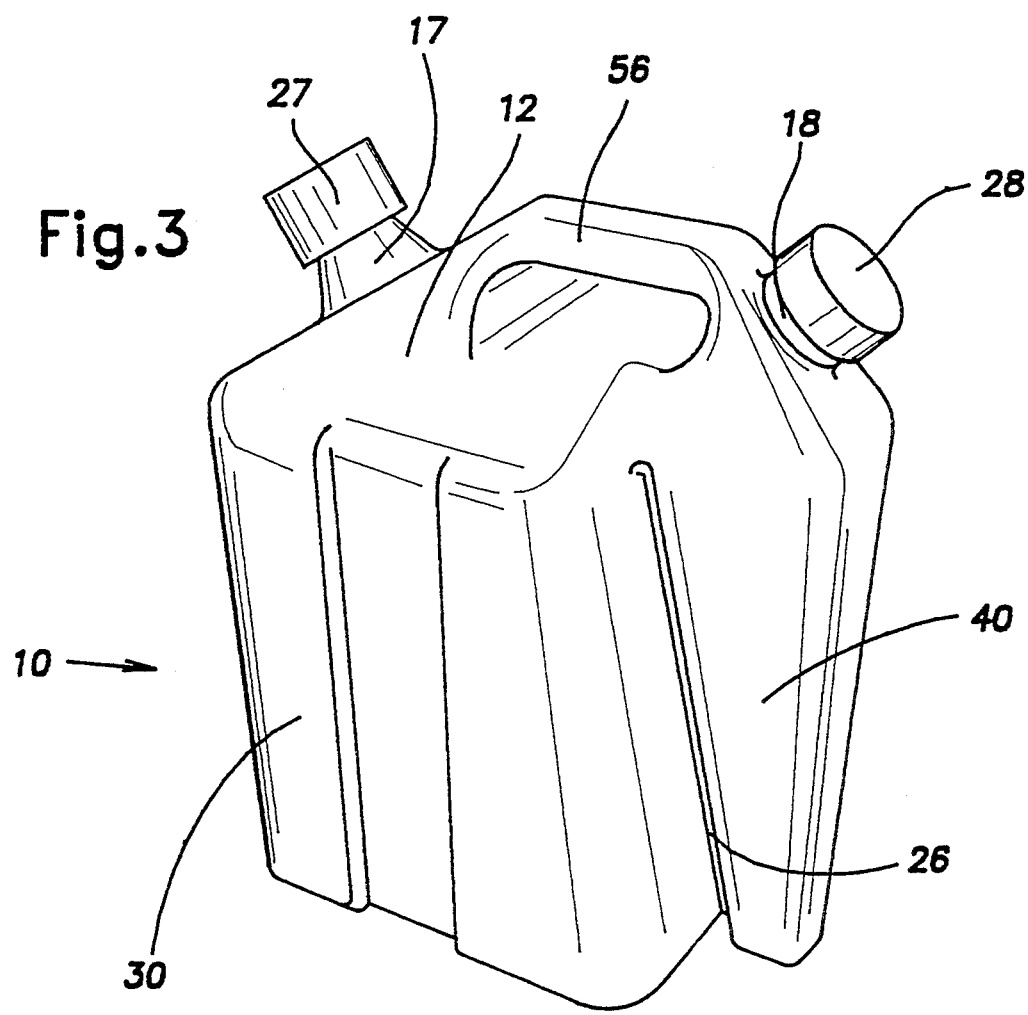
FIG. 3 is a perspective view from above and to the rear of a second embodiment of the container in accordance with the invention, in which the second compartment is pyramid-shaped.
Figure 13:
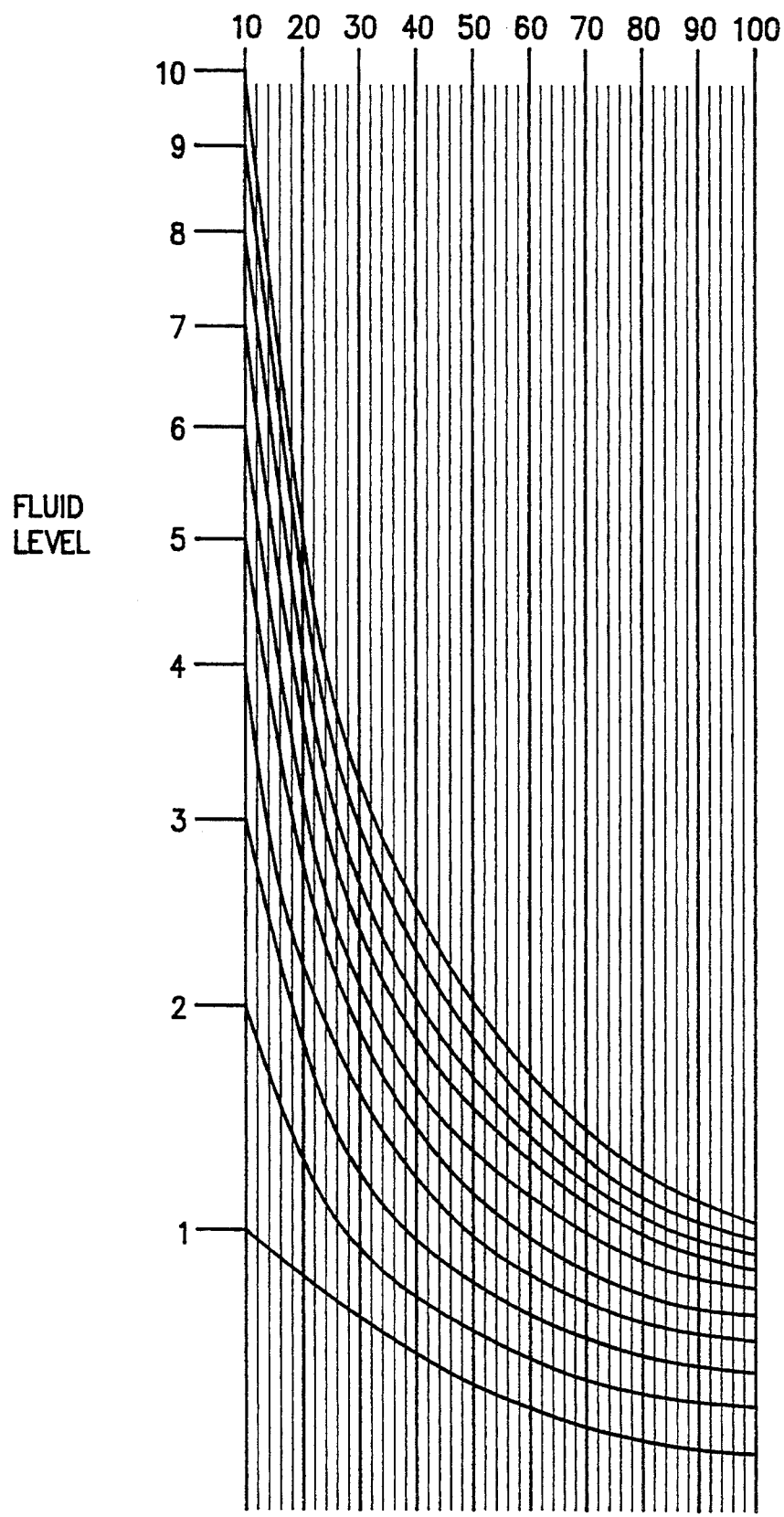
FIG. 13 is a chart providing for selection of mixing ratios of liquids across a continuous range of values, in accordance with the invention.

As best shown in FIG. 1, the wedge-shaped smaller compartment 40 preferably has a constant width, and tapers in a longitudinal direction of the container 10, where the longitudinal direction is defined by an axis from the center of the first opening 17 to the center of the second opening 18. The lateral direction is thereby defined as the direction normal or perpendicular to the longitudinal direction as defined. In this preferred embodiment, a constant lateral width of the smaller compartment 40 allows the end 45 of this compartment to be of adequate width to allow it to function comfortably as a handle. The constant lateral width of the smaller compartment 40 provides space for other measuring indicia, such as a chart as shown in FIG. 13. Other embodiments, such as shown in FIG. 3, may include a smaller compartment which is generally pyramidal or conical and tapers downward either in both the lateral and longitudinal direction, or in the lateral direction only while maintaining a constant width longitudinally, or which tapers down as an inverted cone having no flat sides. The smaller compartment is generally downwardly tapering, this term including the aforementioned wedge shape, a pyramidal shape, a cone shape, or other similar combinations of these shapes in which the compartment is larger at the top than at the bottom, in which a generally horizontal cross sectional area decreases gradually from top to bottom.

A first opening 17 is defined by an integral upstanding cylindrical portion or neck and is disposed vertically above the larger compartment 30, so located that liquid poured into it and intended to enter the larger compartment is precluded from entering the smaller compartment.

A second opening 18, like the first opening 17, is defined by an integral upstanding cylindrical portion or neck and is disposed vertically above the smaller compartment 40, so located that liquid poured into it and intended to pass into the smaller compartment 40 is precluded from entering the first or main compartment 30.

As best shown in FIG. 4, the present invention includes the capability of precluding liquids from reaching the wrong compartment, during the process of pouring the liquid into a particular compartment. This capability arises from two design improvements. The first is that the horizontal distance between the second opening 18 and the throat 22 is substantially increased relative to the length of the throat 22 over that of the prior art, by providing a short throat 22. Secondly, the vertical position of the second opening 18 is positioned downward with respect to the throat 22, so that even if the container 10 is tilted during the process of adding oil or other liquid to the second compartment 40, the oil will not impinge on, run into or even reach near the throat 22.

As illustrated in FIGS. 1 and 4, a single column 36 of spaced graduation marks, 1-8, extends upwardly along at least one side of the main compartment 30 to an elevation at the meeting point of the main compartment 30 and the mixing compartment 20, below the level of the throat portion 22. An array or plurality of discrete graduated columns 46-51 extend upwardly along one or more sides of the smaller compartment 40, the graduation marks 1-8 along each column of the array being numbered with numbers corresponding to those on the main compartment.

The volume relationship between the compartments is predetermined for a specific ratio. The volume contained within the main compartment 30 is shown by the volume-designating indicia along the column 36 on that compartment. The corresponding volume needed in the smaller compartment 40 is shown by the analogous volume-designating indicia along the column of the array shown at 46-51 in FIG. 1, having the desired ratio designation at the top of that column. Thus, the ratio-designation indicates the proper volume of oil or other second liquid needed to be added to the smaller compartment 40 and then mixed with a proportionate volume of gasoline or other first liquid contained in the main compartment 30 in order to obtain that ratio of gasoline to oil, or more generally, of first or main compartment liquid to second or smaller compartment liquid.

To illustrate the use of the graduated container, assume that the upper surface of a quantity of gasoline or other liquid in the main compartment 30 is at the level number 7, and that a mixture of one part oil in fifteen parts of gasoline is desired. Oil is added to the smaller compartment 40 until the surface of the oil appears at the level number 7 in the column headed by "15" of the array, 15 being the ratio-designation number. The proper ratio of gasoline to oil, 15:1, is thus established when the oil is added up to the 7 level in the column corresponding to this ratio.

An important improvement provided by the present invention is that when measurement of a small amount of gasoline and oil is called for, there is no loss in accuracy and precision in measuring the required volumes. For example, at level number 1, with a ratio of one part oil in fifty parts gasoline, the liquids can be measured with accuracy and precision very close to that obtainable with larger volumes, e.g., at liquid level 8, and lower ratios, e.g., 16:1, of gasoline to oil.

Following addition of the proper amounts of gasoline and oil, the openings 17 and 18 are tightly closed by the fitted caps 27 and 28 respectively, the graduated container 10 is bodily lifted, tilted back and forth, and inverted to thoroughly mix the liquids, after which the modified fuel, or premix, may be poured out for use.

The herein described graduated container 10 is a proportioning and mixing container based on volume relationships, the array of ratio-designating columns providing a range of gasoline to oil ratios generally suitable for most two-cycle engines. For example, as shown in FIG. 4, there can be three ratios on each side or face of the smaller compartment, giving rise to the possibility of providing graduations corresponding to at least nine different ratios. The desired mixing ratios are quickly obtained without requiring any measurements in absolute volume terms. The downward tapering, wedge-shaped smaller compartment 40 provides very accurate measurements of oil, even when small volumes of premix are required or when a high ratio of gasoline to oil is required.

Any desired quantity of liquid may be poured into the main compartment 30, the surface level thereof observed and the corresponding number n from column 36 noted. The proper ratio-designating column 46–51 corresponding to the desired ratio is selected and additive poured into the smaller compartment 40 to the level numbered n in the selected ratio-designating column. Once the level of liquid in the second compartment 40 is at the same level n as the liquid in the first compartment 40, the ratio of the liquids is set. Thereafter, only mixing of the liquids through the mixing compartment 20 is then necessary to effect the proper fuel blend at the selected ratio of gasoline to oil.

The graduated proportioning and mixing container 10 of the present invention includes at least one mounting device, for releasably mounting the container to a stable platform, such as the bed of a truck or other vehicle. Each mounting device comprises a mounting member and a complimentary mounting bracket. The coupling device is preferably an interlocking coupling means, wherein corresponding, complimentary parts are disposed on the mounting member and the mounting bracket, and interlock with each other when the container is mounted. The preferred mounting device is a simple dovetail arrangement, but other interlocking mounting devices are within the scope of the present invention.

Figure 2:
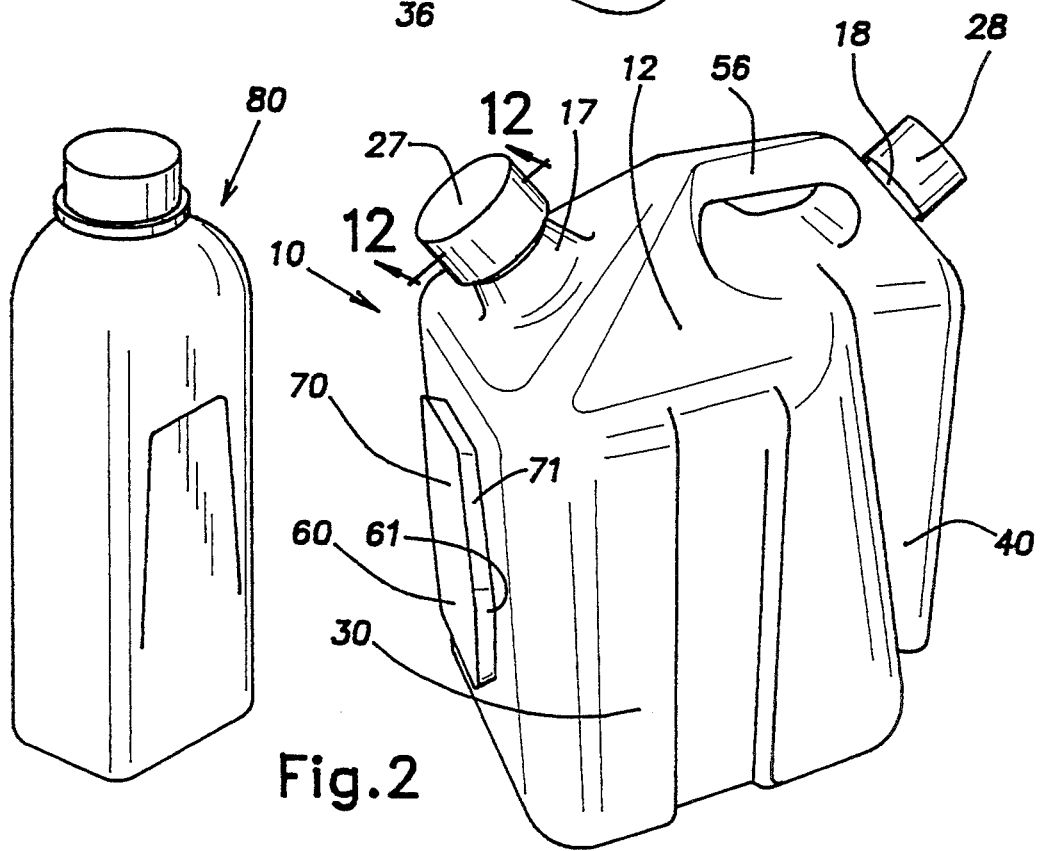
FIG. 2 is a perspective view from above and from the front of the container in accordance with the invention, also showing the auxiliary container.
Figure 10:
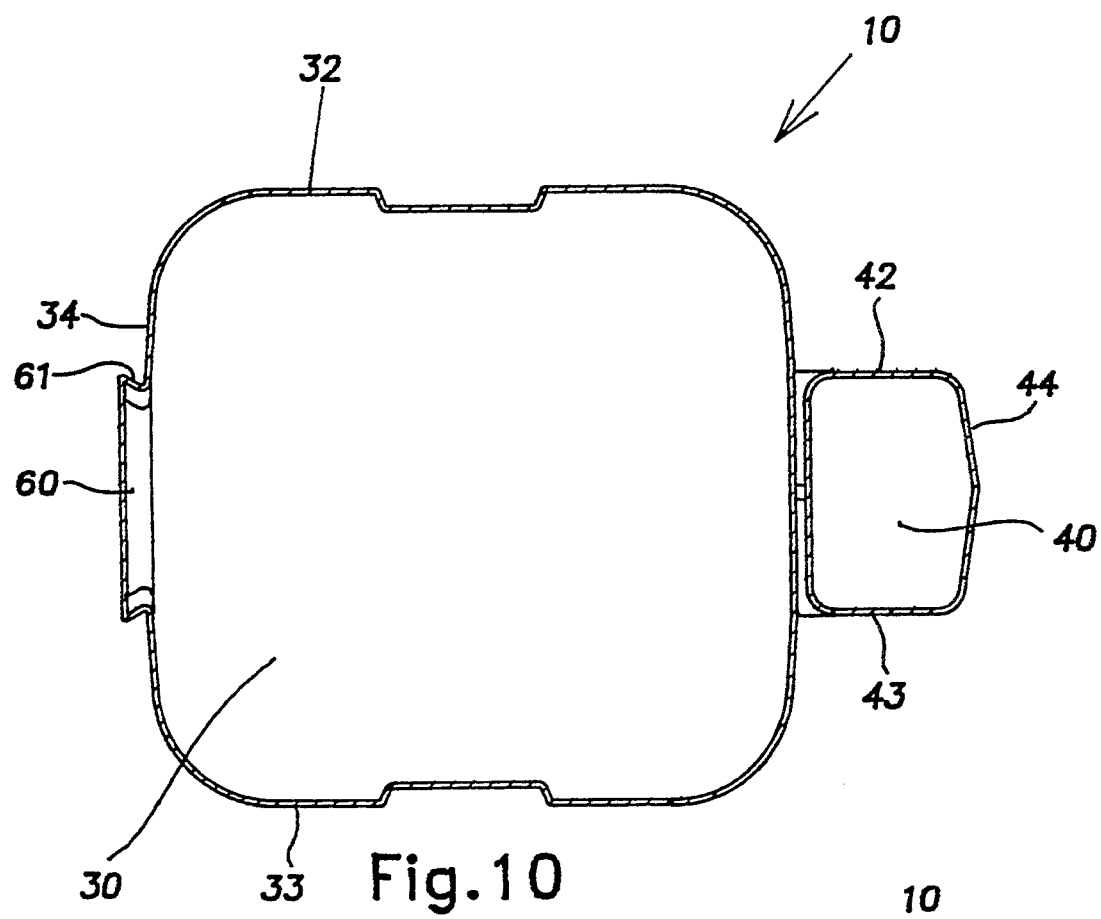
FIG. 10 is a sectional view of the container at line 10—10 of FIG. 4.
Figure 11:
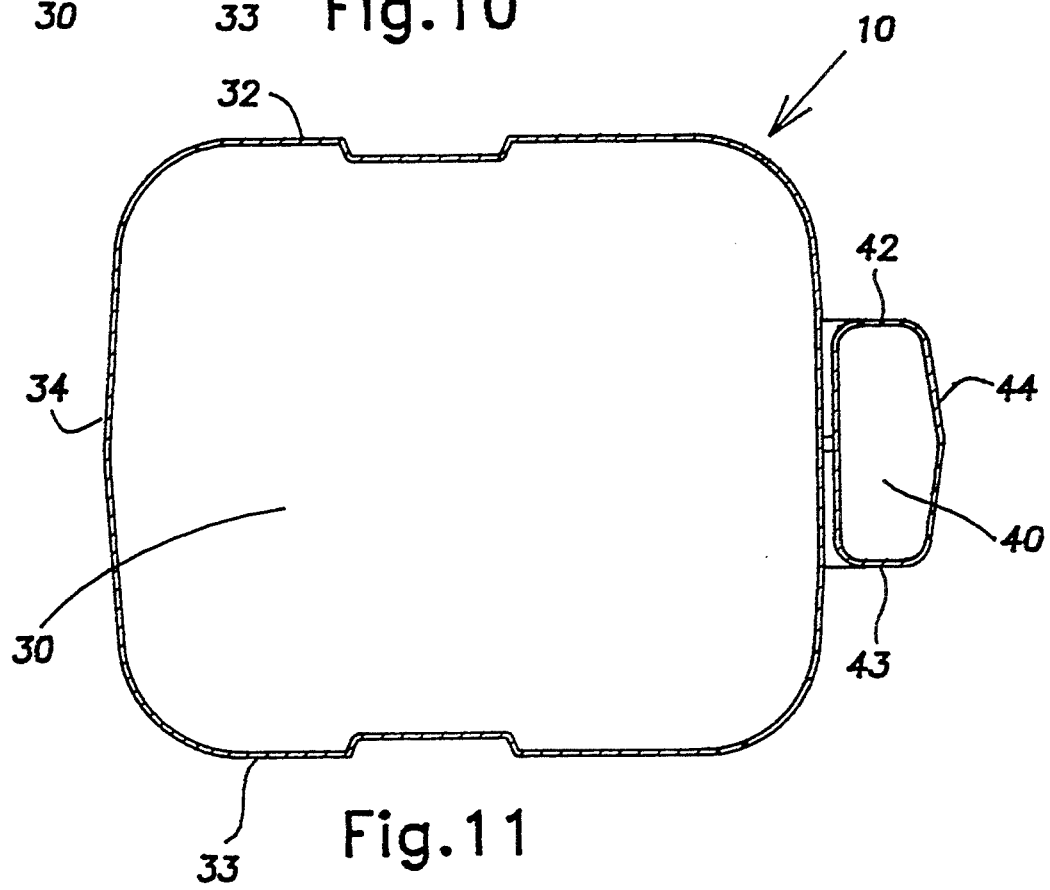
FIG. 11 is a sectional view of the container at line 11—11 of FIG. 4.

The first preferred mounting member is a trapezoidal dovetail member 60 as depicted in FIG. 2. This first mounting member 60 is stepped or projects outwardly from one end of the container, preferably the end on main compartment 30. The outwardly stepped member 60 has edges or flanges 61 that are beveled outward, or laterally, as shown in FIGS. 2 and 10. The outward or lateral bevel of the edge 61 is such that the outermost portion of the edge 61 is wider than the portion of the flange or edge 61 directly attached to the container. The trapezoidal shape of the first mounting member 60 points generally downward, with two parallel sides of unequal length horizontally oriented, the shorter parallel side disposed lower and the longer parallel side disposed higher.

Figure 8:
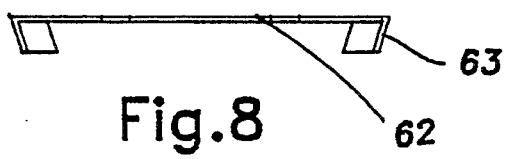
FIG. 8 is a top plan view of an mounting bracket in accordance with the invention.
Figure 9:
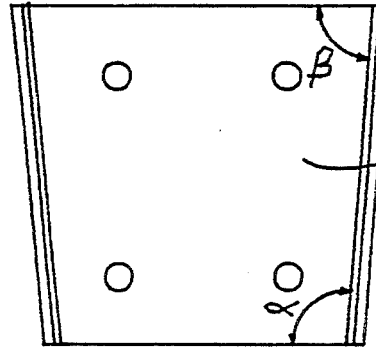
FIG. 9 is a front elevational view of the mounting bracket in accordance with the invention.

The first mounting member 60 is adapted to fit within the preferably metal first mounting bracket 62, shown in FIGS. 8 & 9, which has a shape complimentary to the mounting member 60. Thus, in use the first mounting bracket 62 is attached to a vertical portion of the stable platform, and has outwardly extending flanges 63. So as to have a complimentary shape to the edges of the member, these flanges 63 are beveled laterally inwardly at an angle equivalent to that of the outwardly stepped member 60. The first mounting bracket 62 is trapezoidal, the shape of the trapezoid corresponding closely or being congruent to that of the first mounting member 60, and directed in a parallel direction. The length of both parallel sides of the trapezoid of the first bracket 62 is preferably slightly greater than the same distance on the first mounting member 60, such that the lower portion of the first mounting member 60 extends downwardly beyond the lower edge of the first bracket 62.

Preferably, the first mounting bracket is mounted on the vertical portion of the stable platform at a height selected to allow substantially all of the weight of the container to be borne by the bottom of the container bearing upon the horizontal surface of the stable platform. Thus the primary purpose of the mounting device is to provide a stable mount for transporting the container.

The shape of the bracket 62 may be slightly different from that of the member to facilitate insertion and removal of the member from the bracket, and to accommodate slight variation in vertical alignment of the bracket. Thus, the angle, $\alpha$, between the lower parallel side and the flanges 63 of the bracket trapezoid may be up to a few degrees more obtuse than the corresponding angle $\alpha'$ at the lower corners of the member 60 trapezoid, and the angle, $\beta$, between the upper parallel side and the flanges 63 may be up to a few degrees more acute than the corresponding angle, $\oplus'$, in the mounting member 60. If the angles were exactly the same, the weight of the container 10 might force the member 60 so deeply into the bracket 62 that it would be difficult to remove.

The trapezoids of the member 60 and the bracket 62 are preferably regular, with the shorter of the two parallel sides thereof oriented downward. In the most preferred configuration, the trapezoids have two flanged non-parallel sides each approximately three inches in length, upper parallel sides approximately four inches in length, and lower parallel sides approximately three inches in length. The trapezoids of the first mounting member 60 and bracket 62 have complimentary shapes and are capable of interlocking, releasable attachment.

The container 10 of the preferred embodiment of the present invention has a second mounting device, similar to the first mounting device, but having a trapezoidal shape which is inverted relative to that of the first device. In a more preferred embodiment, the second member 70 is mounted "back to back" with the first member 60, as shown in FIGS. 2 and 5. Thus, in the more preferred embodiment, the two mounting members 60 and 70, rather than forming two separate trapezoids, form a single hexagonally shaped outwardly extending portion, best shown in FIG. 5. The edges of the single hexagonally shaped outwardly extending portion have the configuration given above. The hexagonal-shape preferably has four sides four inches in length, and two horizontally aligned parallel sides three inches in length.

The second mounting device has a mounting member 70 similar to that of the first mounting device, except that the member 70 is inverted relative to member 60. Thus, the second preferred mounting member 70 is a trapezoidal dovetail member as depicted in FIGS. 2 & 5. This second mounting member 70 is stepped or projects outwardly from one end of the container, having outwardly stepped edges, with the outwardly extending edge 71 beveled laterally outward, such that the portion of the edge 71 extending furthest outward is wider than the portion of the edge directly attached to the end of the container.

The trapezoidal shape of the second mounting member 70 is oriented upward, with its shorter parallel side up, and with the other, longer parallel side of the trapezoid disposed downwardly. The second mounting member 70 of the second mounting device is preferably thus oriented whether or not it is mounted "back-to-back" with the first mounting device.

The second mounting member 70, as shown in FIGS. 2 and 4, is adapted to receive and fit within both a second, auxiliary mounting bracket 74, and a molded mounting bracket 72 having the same general shape as bracket 74 but formed into a side of an auxiliary container. The molded mounting bracket 72 and the auxiliary mounting bracket 74 have a shape complimentary to the member 70. Both of the brackets 72 and 74 can allow the auxiliary container to rest upon the bracket to form a mounting device for the auxiliary container.

In the preferred embodiment of the invention, the mounting bracket 72 is molded as an integral part of the preferably plastic auxiliary container 80, while the auxiliary mounting bracket 74 is preferably metal and is preferably mounted adjacent mounting bracket 62 on the stable platform.

Thus, in use the molded mounting bracket 72 is molded as a recess into a vertical portion of the auxiliary container 80, having edges which expand outwardly as the depth of the recess increases into the container 80. Thus is achieved the complimentary shape between the second member 70 and the second bracket 72.

As with the bracket of the first mounting device, the preferred molded mounting bracket 72 is trapezoidal, the shape of the trapezoid corresponding closely to that of the mounting member 70, and directed in a vertically parallel direction. Like the trapezoids of the first mounting device, the trapezoids of the second mounting device have complimentary shapes and are capable of interlocking, releasable attachment. The trapezoids of the second member 70 and the bracket 72 are preferably regular, with the shorter parallel side thereof disposed upwardly, and the longer parallel side directed downwardly, and both parallel sides horizontal. In the most preferred configuration, for a container of approximately 5 gallons capacity, the trapezoid of member 70 and brackets 72 and 74 has two non-parallel sides approximately four inches in length, one parallel side of approximately four inches in length, and one parallel side approximately three inches in length. The trapezoids of the second mounting device have complimentary shapes and are capable of interlocking, releasable attachment.

For containers of smaller volume, the mounting devices may be smaller than that described for a five gallon container, but it also may be desirable to have a single size mounting device for a contemplated range of container volumes, such as 3, 4 and 6 gallon capacities.

Finally, the auxiliary container 80 is capable of being mounted on the auxiliary bracket 74, which is preferably also mounted on the stable platform near the first mounting bracket 62. The auxiliary bracket 74 for mounting the auxiliary container 80, like the first bracket 62, is preferably metal, and is attached to the stable platform for use.

Figure 6:
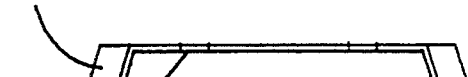
FIG. 6 is a top plan view of an auxiliary bracket in accordance with the invention.
Figure 7:
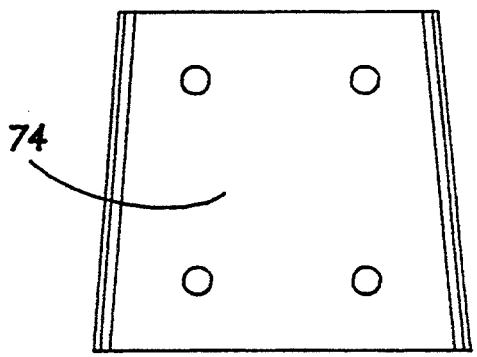
FIG. 7 is a front elevational view of the auxiliary bracket in accordance with the invention.

The auxiliary bracket 74 has outwardly extending flanges, matching those on the second mounting member 70 of container 10. As shown in FIGS. 6 and 7, the auxiliary bracket 74, like the mounting members 60 and 70, is a trapezoidal dovetail member. The auxiliary bracket 74 has flanges 75 which project outwardly, and the outwardly extending flanges 75 are beveled laterally outward, as shown best in FIG. 6. The trapezoidal shape of the auxiliary bracket is oriented generally upward, as suggested by FIGS. 6 and 7, with its shorter parallel side up, and with the other, longer parallel side of the trapezoid disposed downwardly. In general, the auxiliary bracket 74 should have an overall shape substantially duplicating the mounting member 70 of the second mounting device.

Thus, in the preferred embodiment, which has the two mounting members 60 and 70 mounted back-to-back, when the container 10 is transported in a vehicle having a stable platform, the first mounting device is used to immobilize the container 10 on the stable platform. In order to so mount the container 10, the auxiliary container 80, if present, must be removed from its position mounted by the second mounting device. For transport, the auxiliary container 80 may be mounted on its auxiliary bracket 74. The auxiliary bracket 74 is preferably mounted similarly and conveniently nearby the mounting bracket 62 of the first mounting device on the stable platform.

The auxiliary container 80 may be any container of a size consistent with mounting on the second mounting device and the auxiliary bracket 74. The auxiliary container 80 may be constructed of plastic or other material, and may be used to carry additional fuel, water, or any other desired materials. The auxiliary container 80 need only have a molded mounting bracket 72 as described above or the equivalent capable of being releasably attached to the mounting member or auxiliary bracket. The auxiliary container may also comprise a container for holding spare parts, tools, and other needed accessories.

The mounting device of the auxiliary container and bracket, while preferably of the described dovetail configuration, like the mounting device for the container 10, may have other configurations of interlocking surfaces comprised in the coupling means of the invention.

The openings in the top of the container 10 have been briefly described as being sealable with fitted Caps 27 and 28. Most preferably the two openings 17 and 18 are identical in size and use identical caps. Whether or not both are the same size, both preferably have three sealing means. The openings 17 and 18, together with the fitted caps 27 and 28, are shown in FIG. 12.

Figure 12:
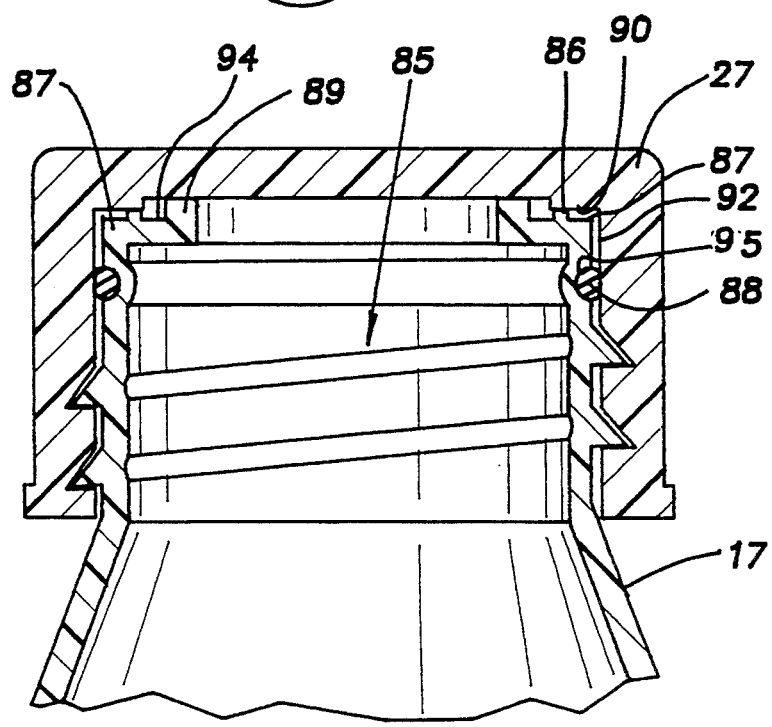
FIG. 12 is a sectional view of the opening and cap of the container in accordance with the invention, at line 12—12 of FIG. 2.

As shown in detail in FIGS. 4 and 12, each of the openings 17 and 18 has a mouth 85, each associated with three sealing devices. As shown in detail in FIG. 12, the first circumferential sealing device is a raised or embossed circumferentially continuous ring 86 near the inner limit of a flattened radially outer surface 87 of the mouth 85, the second circumferential sealing device is a raised circumferentially continuous portion 89 positioned radially inward from the ring 86, which borders and partially defines the mouth 85, and the third sealing device is an elastomeric, renewable O-ring 88 disposed in a groove 95 on the outer cylindrical surface slightly axially removed from the flat area 87 of the mouth 85. The elastomeric nature of the O-ring allows it to be compressed and thereby form a tight seal, while the renewable nature of the O-ring allows it to be replacement if damaged, thus allowing at least one of the seals to be operable even when the openings 17 or 18 have been damaged.

Each fitted cap 27, 28 has surfaces which interact with each of these sealing devices to provide a triple seal for each opening. As shown in FIG. 12, the fitted cap 27 has a first flat surface 90 which interacts with the embossed ring 86 to create the first circumferential seal when the cap 27 is tightly closed. The cap 27 is further provided with a second flat surface 94, which is slightly recessed relative to the first flat surface 90. The second flat surface 94 interacts with the raised surface 89 of the opening 85, to form the circumferential second sealing device. The fitted cap 27 has a cylindrical inner surface section 92 which interacts with the O-ring 88 when the cap 27 is both tightly closed and when the cap 27 is less than tightly closed. Thus, the O-ring 88 forms the third sealing device, which provides extra protection, particularly from voluminous leakage of contents of the container, when the cap is left only partially tightened.

Thus, the first sealing device comprises the raised ring 86 pressing against the first flat surface 90 of the cap 27, the second sealing device comprises the raised surface 89 pressing against the second flat surface 94 of the cap 27, and the third sealing device comprises the O-ring 88 pressing against the inner cylindrical surface 92 of the cap 27. In the preferred embodiment illustrated in FIG. 12, the second sealing device is located radially inward from and is adjacent to the embossed ring 86, both of which are in turn radially inward from the flat area 87. In the preferred embodiment, the second opening 18 and its cap 28, which are not separately shown in detail, comprise three sealing devices having features essentially identical to those of the first opening 17 and its cap 27 as described.

The sealing means are preferably three in number, as described. The container 10 may alternately be equipped with either single or double sealing means, incorporating one or two of the three disclosed means, or other known sealing means.

The openings 17 and 18, as illustrated in FIGS. 3, 4 and 12, are preferably generally cylindrical projections from the top of the container, with threads or other means for releasably but securely retaining the caps 27 and 28 in position on the openings 17 and 18, by which container 10 may be securely sealed for mixing the liquids measured into the first and second liquid-receiving compartments 30 and 40. In the most preferred embodiment, when the caps 27 and 28 are fully tightened down, the outermost projection of either cap does not extend beyond a plane defined by the generally vertical end portions of the container 10, so that the container 10 retains its preferred rectilinear shape.

As best shown in FIG. 4, graduated container 10 has a webbed portion 26 connecting the second compartment 40 to the first compartment 30. Each compartment has a side that is adjacent to a side of the other compartment. The webbed portion 26 preferably connects the compartments along the full length of the adjacent sides of the compartments. The webbing 26 is preferably of a sufficiently heavy gauge to provide support to the entire container when the lowermost portion 45 of the second container 40 is used as the second handle 54. The width of the webbed portion 26 is preferably small, such that the separation between the main compartment 30 and the second compartment 40 is minimal. The preferred width is from 1/16–1/8 inch (1.5–3 mm) for the five gallon size. Clearly, the smaller this space can be made, the greater the capacity available for the two containers for a given set of outside dimensions for container 10.

As is best shown in FIG. 4, the base or lower portion of the liquid receiving compartments 30 and 40, the curvature of the compartments creates the slot 16 which is large enough to allow the fingers of a user to enter the slot 16, thereby forming the second handle 54. The slot 16 may be larger, or the shape of the main compartment 30 might be altered in this area, if needed to provide a larger opening to receive the user's fingers. The junction of the web 26, the bottom of the main compartment 30 and the bottom 45 of the smaller compartment 40 defines a finger-receiving area of the second handle 54.

FIG. 13 is a ratio and quantity designating chart providing an incrementally continuous range of mixing ratios. The chart is molded, printed, labelled or otherwise applied to a wall of the smaller compartment 40 of the container 10. The chart is preferably molded into a flat end wall of the second compartment 40 of container 10. The chart provides the user with an incrementally continuous range of quantities of the second fluid to be mixed with the first fluid, at incrementally continuous ratios of the first fluid to the second fluid.

The ratio and quantity designating chart has incrementally continuous ratios ranging from 10:1 to 100:1 on the X-axis, and fluid level in the large compartment 30 shown on the Y-axis.

In use, the user first fills the large compartment to a selected level, e.g. 5, with the liquid, e.g. gasoline, to be dosed with a second liquid, e.g., oil. Second, the user locates a line on a chart such as that shown in FIG. 13 corresponding to this fluid level. The line on the chart may be curved, straight or otherwise, as determined by the relative configuration of the first and second compartments. Third, the user selects the ratio needed. The point of intersection between the straight, vertical ratio lines and the curved fluid level lines is the point to which the second liquid is filled to obtain the selected ratio of first to second liquids. Fourth, the user fills the second liquid to the indicated level, at the point of intersection of the curved line representing the fluid level in the large compartment and the vertical line representing the desired ratio. Finally, the container openings are sealed and the contents mixed by shaking, inverting and otherwise moving the container to provide mixing action.

The ratio and quantity designating chart makes it possible for the user to interpolate ratios between the discrete ratios given in the array 46–51 of ratio-designating columns, and to use a single chart for all ratios. Thus, for example, if the array 46–51 includes ratios of 20:1 and 30:1, and the user needs a ratio of 24:1, the user can easily make the proper correct measurements using the continuous chart in FIG. 13.

While the present invention has been shown and described in its preferred embodiment, various modifications and adaptations to the preferred embodiment may be made without departing from the scope of the invention. For example, while the preceding disclosure is written with reference to mixing gasoline and oil for use in two-cycle engines, the mixing container of the present invention could be used for mixing any two or more liquids together which require ratios within the range of the present mixing container, without departing from the scope of the invention.

What is claimed is:

1. A three compartment graduated proportioning and mixing container of translucent to transparent material having a top and a generally flat bottom, said container comprising
   a horizontally extending mixing compartment including a generally horizontally extending handle subjacently and coextensively underlying said top,
   a first liquid-receiving compartment of relatively large capacity,
   a second liquid-receiving compartment of relatively small capacity,
   a throat in said mixing compartment, said throat defining a relatively restricted portion of said mixing compartment bounded by said handle separating and isolating said first and said second compartments, longitudinally spaced openings in said top, a first opening above said first compartment and a second opening above said second compartment, said handle overlying said throat and thereby shielding it from said second opening so as to prevent liquid poured through said second opening into said second liquid-receiving compartment from inadvertently entering said first liquid-receiving compartment.

2. A container as claimed in claim 1, wherein said second compartment is downwardly tapering, said downwardly tapering compartment having a cross-sectional area decreasing from top to bottom.

3. A container as claimed in claim 2, wherein said cross-sectional area decreases by decreasing a dimension in a longitudinal direction, said longitudinal direction being defined by an axis connecting said first and second openings.

4. A container as claimed in claim 3, wherein said downwardly tapering compartment has a constant dimension normal to said longitudinal direction.

5. A container as claimed in claim 1, wherein said first compartment has at least one column of graduations on at least one vertical surface, and said second compartment has plurality of vertically spaced and aligned columns of graduations on at least one vertical surface thereof.

6. A container as claimed in claim 5, wherein said plurality of columns on said second compartment are ratio-designated, each of said plurality of columns corresponding to and designating a selected ratio between volumes of liquid in said first compartment and in said second compartment.

7. A container as claimed in claim 1, wherein each said opening has a releasable sealing cap, and each cap and opening cooperate to form at least two means for positively sealing said cap to each said opening.

8. A three compartment graduated proportioning and mixing container of translucent to transparent material having a top and a generally flat bottom, said container comprising a horizontally extending mixing compartment subjacently and coextensively underlying said top, a first liquid-receiving compartment of relatively large capacity extending from said mixing compartment to an area adjacent said bottom, said first compartment having vertically spaced and aligned graduations on at least one vertical side, a second liquid-receiving compartment of relatively small capacity extending from said mixing compartment to an area adjacent said bottom, said second compartment having a plurality of ratio-designated columns on at least one vertical surface thereof, said plurality of columns each corresponding to a selected ratio between volumes of liquid in said first compartment and in said second compartment, said second compartment being downwardly tapering, said downwardly tapering compartment having a cross-sectional area increasing from bottom to top and having a height substantially greater than its maximum width, a throat in said mixing compartment providing communication between said first and said second compartments, said throat defining a relatively restricted portion of said mixing compartment bounded by said top and by a portion of said container separating and providing isolation between said first and said second compartments, longitudinally spaced openings in said top, a first opening above said first compartment and a second opening above said second compartment, said second opening being positioned relative to said throat such that liquid intended to be poured into said second compartment is substantially prevented from entering said first compartment.

9. A container as claimed in claim 8, wherein said first compartment has a shape complimentary to that of said second compartment, whereby said first and said second compartments taken together have a substantially rectilinear shape.

10. A container as claimed in claim 8, wherein a lowermost portion of said second compartment functions as a handle for grasping said container.

11. A container as claimed in claim 8, wherein each said opening has a releasably sealing cap, and each cap and opening cooperate to form at least two means for sealing each said cap to each said opening.

12. In combination, a graduated mixing and proportioning container of translucent to transparent material having a top and a generally flat bottom, said container comprising a first interlocking mounting member disposed upon an outer vertical wall of said container, for releasably mounting said container to a complementary mounting bracket for stabilizing said container, a second interlocking mounting member disposed on an outer vertical wall of said container, for releasably mounting an object on said container, said object having a mounting structure complimentary to said second interlocking mounting member, a horizontally aligned first handle, said first handle located at said top of said container when said container is in an upright position, the horizontal handle and said outer vertical wall allowing said container to be conveniently lowered onto and lifted off the mounting bracket, at least one opening for filling and emptying said container, and a mounting bracket having a configuration complementary with the first interlocking mounting member and apertured for attachment to a stable platform, said first interlocking mounting member being an outwardly stepped dovetail section having outwardly beveled edges and being smaller at its lower end than at its upper end, said second interlocking mounting member being an outwardly stepped dovetail section having outwardly beveled edges and being smaller at its upper end than at its lower end.

13. A container as claimed in claim 12, further comprising a second handle, said second handle located to facilitate pouring liquid from said container.

14. A container as claimed in claim 13, wherein said second handle is located at a lowermost portion of a second compartment.

15. A container as claimed in claim 12, wherein said first handle is longitudinally removed from the center of said container.

16. A container as claimed in claim 15, wherein said first handle is longitudinally closer to said second compartment.

17. A container as claimed in claim 12, wherein said first interlocking mounting member is an outwardly stepped dovetail section having outwardly beveled edges, and said outwardly stepped portion is smaller at its lower end than at its upper end and wherein said second interlocking mounting member is an outwardly stepped dovetail section having outwardly beveled edges, and said outwardly stepped portion is smaller at its upper end than at its lower end.

18. A container as claimed in claim 12, wherein said upper end of said first dovetail mounting member and said lower end of said second dovetail mounting member are contiguous.

19. A container as claimed in claim 18, wherein said first dovetail mounting member and said second dovetail mounting member are mounted on an outer vertical surface of said first container.

20. A container as claimed in claim 12, wherein said at least one opening has a releasably sealing cap, and each cap and opening cooperate to form at least two means for sealing each said cap to said at least one opening.

21. A three compartment graduated proportioning and mixing container of translucent to transparent material having a top and a generally flat bottom, said container comprising
   a horizontally extending mixing compartment subjacently and coextensively underlying said top,
   a first liquid-receiving compartment of relatively large capacity, said first compartment having vertically spaced and aligned graduations on at least one vertical side,
   a second liquid-receiving compartment of relatively small capacity, said second compartment having a plurality of vertically spaced and aligned columns of ratio-designated graduations on at least one vertical surface thereof, said plurality of columns each corresponding to a selected ratio between volumes of liquid in said first compartment and in said second compartment, and said second compartment extending substantially from the top of the container to the bottom of the container, being downwardly tapered and having a cross-sectional area increasing from bottom to top,
   said first compartment has a shape complimentary to that of said second compartment, and said first and said second compartments taken together have a substantially rectilinear shape
   a throat in said mixing compartment, said throat defining a relatively restricted portion of said mixing compartment bounded by said top and by a portion of said container separating said first and said second compartments,
   longitudinally spaced openings in said top, a first opening above said first compartment and a second opening above said second compartment, said second opening being positioned relative to said throat such that liquid intended to be poured into said second compartment is substantially prevented from entering said first compartment,
   a first interlocking mounting member disposed upon an outer vertical wall of said container, for releasably mounting said container to a complementary mounting bracket for stabilizing said container, said first interlocking mounting member is an outwardly stepped member having outwardly beveled edges, and said outwardly stepped member is smaller at its lower end than at its upper end;
   a second interlocking mounting member disposed on an outer vertical wall of said container, for releasably mounting an object on said container, said object having a mounting bracket complimentary to said second interlocking mounting member, said second interlocking mounting member is an outwardly stepped section having outwardly beveled edges, and said outwardly stepped portion is smaller at its upper end than at its lower end
   a horizontally aligned first handle, said first handle located at said top of said container when said container is in an upright position;
   a second handle, said second handle located at a lowermost portion of said second compartment
   each of said openings has a releasably sealing cap, and each cap and opening cooperate to form at least two means for sealing each said cap to said openings.

22. A container as claimed in claim 21, wherein said cross-sectional area increases by increasing a dimension in a longitudinal direction, said longitudinal direction defined by an axis connecting said first and second openings.

23. A container as claimed in claim 22, wherein said downwardly tapering compartment has a constant dimension normal to said longitudinal direction.

24. A container as claimed in claim 21, wherein said first handle is longitudinally removed from the center of said container.

25. A container as claimed in claim 24, wherein said first handle is longitudinally closer to said second compartment.

26. A three compartment graduated proportioning and mixing container of translucent to transparent material having a top and a generally flat bottom, said container comprising
   a horizontally extending mixing compartment subjacently and coextensively underlying said top,
   a first liquid-receiving compartment of relatively large capacity, said first compartment having vertically spaced and aligned graduations on at least one vertical side,
   a second liquid-receiving compartment of relatively small capacity, said second compartment having a plurality of vertically spaced and aligned columns of ratio-designated graduations on at least one vertical surface thereof, said plurality of columns each corresponding to a selected ratio between volumes of liquid in said first compartment and in said second compartment, and said second compartment being downwardly tapering, said downwardly tapering compartment having a cross-sectional area increasing from bottom to top,
   said first compartment has a shape complimentary to that of said second compartment, and said first and said second compartments taken together have a substantially rectilinear shape
   a throat in said mixing compartment, said throat defining a relatively restricted portion of said mixing compartment bounded by said top and by a portion of said container separating said first and said second compartments,
   longitudinally spaced openings in said top, a first opening above said first compartment and a second opening above said second compartment, said second opening being positioned relative to said throat such that liquid intended to be poured into said second compartment is substantially prevented from entering said first compartment,
   a first interlocking mounting member disposed upon an outer vertical wall of said container, for releasably mounting said container to a complementary mounting bracket for stabilizing said container, said first interlocking mounting member is an outwardly stepped member having outwardly beveled edges, and said outwardly stepped member is smaller at its lower end than at its upper end;

a second interlocking mounting member disposed on an outer vertical wall of said container, for releasably mounting an object on said container, said object having a mounting bracket complimentary to said second interlocking mounting member, said second interlocking mounting member is an outwardly stepped section having outwardly beveled edge, and said outwardly stepped portion is smaller at its upper end than at its lower end a horizontally aligned first handle, said first handle located at said top of said container when said container is in an upright position;

a second handle, said second handle located at a lowermost portion of said second compartment each of said openings has a releasably sealing cap, and each cap and opening cooperate to form at least two means for sealing each said cap to said openings, said first and second interlocking mounting members being dovetail mounting members, and said upper end of said first dovetail mounting member and said lower end of said second dovetail mounting member being contiguous.

27. A container of blow-molded material having a top and a generally flat bottom, said container comprising a first relatively large compartment with a first fill opening adjacent the top, a second relatively small compartment with a second fill opening adjacent the top, said small compartment substantially separated from said large compartment at portions away from the top and communicating with said large compartment adjacent the top, said small compartment tapering substantially from said bottom to said top, being smaller at the bottom and larger at the top, said large compartment having a shape complementary to said small compartment, said container being integrally molded.

28. A container as claimed in claim 27, further comprising a ratio and quantity designating chart, said chart providing an incrementally continuous range of ratios, and having means thereon to indicate a level of a second liquid to be added to said small compartment to provide a selected ratio of said second liquid to a first liquid contained in said large compartment when said first and second liquids are mixed together in said container, said chart disposed upon a wall of said smaller compartment.

* * * * *